United States Patent
De Zeeuw et al.

(10) Patent No.: US 9,889,468 B2
(45) Date of Patent: Feb. 13, 2018

(54) METHOD FOR MANUFACTURING COATED CAN LIDS

(71) Applicant: Henkel AG & Co. KGaA, Duesseldorf (DE)

(72) Inventors: Ard De Zeeuw, Duesseldorf (DE); Thomas Moeller, Duesseldorf (DE); Nicole Auweiler, Dormagen (DE)

(73) Assignee: Henkel AG & Co. KGaA, Duesseldorf (DE)

(*) Notice: Subject to any disclaimer, the term of this patent is extended or adjusted under 35 U.S.C. 154(b) by 143 days.

(21) Appl. No.: 14/739,202

(22) Filed: Jun. 15, 2015

(65) Prior Publication Data

US 2016/0038973 A1    Feb. 11, 2016

Related U.S. Application Data

(63) Continuation of application No. PCT/EP2013/076954, filed on Dec. 17, 2013.

(30) Foreign Application Priority Data

Dec. 17, 2012  (DE) .................. 10 2012 223 356

(51) Int. Cl.

| | |
|---|---|
| *C09D 123/08* | (2006.01) |
| *B05D 7/16* | (2006.01) |
| *B05D 5/00* | (2006.01) |
| *B05D 3/12* | (2006.01) |
| *B05D 1/02* | (2006.01) |
| *C09D 5/02* | (2006.01) |

(52) U.S. Cl.
CPC .................. *B05D 7/16* (2013.01); *B05D 1/02* (2013.01); *B05D 3/12* (2013.01); *B05D 5/00* (2013.01); *C09D 5/02* (2013.01); *C09D 123/0869* (2013.01); *C09D 123/0876* (2013.01); *B05D 2202/00* (2013.01); *B05D 2202/25* (2013.01); *B05D 2252/00* (2013.01); *B05D 2252/02* (2013.01); *B05D 2252/04* (2013.01); *B05D 2252/10* (2013.01); *B05D 2401/20* (2013.01); *B05D 2503/00* (2013.01); *B05D 2508/00* (2013.01); *B05D 2701/10* (2013.01)

(58) Field of Classification Search
CPC ... B05D 1/02; B05D 3/12; B05D 5/00; B05D 7/16; B05D 2202/00; B05D 2202/25; B05D 2252/00; B05D 2252/02; B05D 2252/04; B05D 2252/10; B05D 2401/20; B05D 2503/00; B05D 2508/00; B05D 2701/10; C09D 5/02; C09D 123/0869; C09D 123/0876

USPC .......................... 427/209, 289, 409
See application file for complete search history.

(56) References Cited

U.S. PATENT DOCUMENTS

| | | | |
|---|---|---|---|
| 7,659,341 B2 | 2/2010 | Wamprecht et al. | |
| 9,365,727 B2 | 6/2016 | Smith et al. | |
| 2003/0187128 A1 | 10/2003 | Shiba et al. | |
| 2008/0193689 A1 | 8/2008 | Masselin et al. | |
| 2012/0125801 A1* | 5/2012 | Kainz ................... | B65D 25/14 206/524.3 |
| 2014/0023782 A1* | 1/2014 | Kunz ................... | B65D 25/14 427/239 |

FOREIGN PATENT DOCUMENTS

| | | |
|---|---|---|
| CN | 1621465 A | 6/2005 |
| CN | 102533057 A | 7/2012 |
| DE | 2514397 A1 | 12/1975 |
| EP | 1361248 A1 | 11/2003 |
| EP | 2031006 A1 | 3/2009 |
| EP | 2505625 A1 | 10/2012 |
| JP | 2005075878 A | 3/2005 |
| JP | 2005075879 A | 3/2005 |
| JP | 20060022127 A | 1/2006 |
| WO | 2004053183 A2 | 6/2004 |
| WO | 2006045017 A1 | 4/2006 |

OTHER PUBLICATIONS

International Search Report for PCT/EP2013/076954, dated Mar. 19, 2014.
International Search Report for PCT/EP2013/076963, dated Feb. 21, 2014.

* cited by examiner

*Primary Examiner* — William Phillip Fletcher, III
(74) *Attorney, Agent, or Firm* — Mary K. Cameron

(57) ABSTRACT

The present invention relates to a method for manufacturing coated can lids from aluminum strip, and is based on the finding that flexible, easily formable coatings having high abrasion resistance result from the use of water-based lacquers containing a copolymer or a copolymer mixture of at least one aliphatic, acyclic alkene with at least one α,β-unsaturated carboxylic acid in water-dispersed form, and a curing system. In a preferred embodiment of the method, the application of a primer coating can be dispensed with entirely when water-soluble compounds of the elements Zr and/or Ti in the lacquer are used as the curing system.

18 Claims, No Drawings

METHOD FOR MANUFACTURING COATED CAN LIDS

STATEMENT REGARDING FEDERALLY SPONSORED RESEARCH

NONE

A method for manufacturing coated can lids from aluminum strip, wherein initially a lacquer formulation is applied to aluminum strip and cured, and the lid material is subsequently punched from the strip and formed into the can lid, the lacquer formulation being a water-based lacquer containing a copolymer or a copolymer mixture of at least one aliphatic, acyclic alkene with at least one $\alpha,\beta$-unsaturated carboxylic acid in water-dispersed form, and a curing system; wherein the dispersed polymeric components of the water-based lacquer have a D50 value of less than 1 μm. In a preferred embodiment of the method, the application of a primer coating can be dispensed with entirely when water-soluble compounds of the elements Zr and/or Ti in the lacquer are used as the curing system.

Numerous methods are known in the prior art for the corrosion-protective coating of aluminum surfaces, in which typically a primer coating is initially applied, followed by an organic lacquer layer. The application of a primer coating over a conversion coating is usually necessary to minimize corrosive delamination of the lacquer layer. In particular in the production of metallic outer packagings for foods, high quality standards are also imposed on the coating of the outer packaging to ensure that no contamination of the food via corrosive infiltration of metals or via delamination and abrasion of lacquer particles occurs. The requirements for lacquer adhesion of the applied coating are particularly stringent, in particular for the manufacture of can lids from precoated aluminum strip, since the inner side of the can lid of a manufactured can is typically in constant contact with the stored can contents, usually liquids, and is therefore subject to severe corrosion. In addition, the manufacture of can lids is associated with high mechanical stresses on the coating during forming of the metal strip to form the can lid. Peeling of the lacquer layer or the development of irreversible defects in highly stressed areas of the can lid must therefore be prevented. Furthermore, various food hygiene regulations limit the spectrum of possible pretreatments and lacquer coatings. Thus, it is important to largely dispense with chromium-containing pretreatments for applying a primer coating, and with regard to the organic coating, to dispense with bisphenol A-based lacquers, since maximum limits for the migration of bisphenol A from outer packagings into foods are stipulated in EU Directive 2002/72/EU, among other regulations.

WO 04/053183 describes the chromium-free pretreatment of aluminum for the manufacture of coated can lids, prior to coating with an organic lacquer. The pretreatment is based on an acidic aqueous composition containing fluoro complexes of the elements Zr and/or Ti, for example, an organic carboxylic acid having hydroxyl groups, and polyvinylphenol derivatives. According to the cited unexamined patent application, appropriately pretreated aluminum surfaces may be coated with conventional organic protective coatings, meeting on the one hand the particular technical requirements of the can manufacturers for lacquer adhesion and corrosion protection, and on the other hand, the food hygiene requirements for the pretreatment.

In addition, alternatives to epoxy-based can inner coatings are known in the prior art which may be applied in a spray process, which result in homogeneous film formation upon curing, and which have high flexibility and at the same time good lacquer adhesion and resistance to aqueous compositions. EP 2505625 discloses a water-based can inner coating containing a copolymer or a copolymer mixture of at least one aliphatic, acyclic alkene with at least one $\alpha,\beta$-unsaturated carboxylic acid in water-dispersed form, wherein the acid number of the copolymer or the copolymer mixture is at least 20 mg KOH/g but not greater than 200 mg KOH/g, and at least one water-dispersed or water-soluble curing agent is selected from the group of aminoplasts and/or the group of carbodiimides.

Although chromium-free pretreatments, as well as lacquer formulations which are harmless from a food hygiene standpoint, are known in the prior art, there is still a need for methods for manufacturing coated can lids which are simpler procedurally, and therefore usually more cost-effective. In particular for can lids made of aluminum strip, it is important to promote the adhesion of the lacquer coating while at the same time preventing corrosive delamination, wherein the lacquer coating on the one hand should have excellent formability and flexibility, and on the other hand, high abrasion resistance, so that neither peeling nor abrasion from the can lid causes contamination of the stored food.

This spectrum of objects is achieved by a method for manufacturing coated can lids from aluminum strip, in which initially a lacquer formulation is applied to aluminum strip and cured, and the lid material is subsequently punched from the strip and formed into the can lid, wherein as the lacquer formulation which is applied to the aluminum strip, a water-based lacquer is used which in addition to water contains a) a copolymer or a copolymer mixture of at least one aliphatic, acyclic alkene with at least one $\alpha,\beta$-unsaturated carboxylic acid in water-dispersed form, wherein the acid number of the copolymer or the copolymer mixture is at least 20 mg KOH/g but not greater than 200 mg KOH/g, and the acid groups of the copolymer or the copolymer mixture in water-dispersed form are at least 20% neutralized, but not more than 60% neutralized, and b) at least one water-soluble curing agent, wherein the dispersed polymeric components of the water-based lacquer have a D50 value of less than 1 μm.

According to the invention, aluminum strip refers to a flat product made of aluminum or an aluminum alloy, wherein the flat product may be present in the form of a sheet or as a quasi-continuous strip which is unrolled from a coil.

According to the invention, a water-based lacquer comprises a dispersion and/or emulsion of organic polymers in a continuous aqueous phase, within the scope of the present invention an aqueous phase also being understood to mean a homogeneous mixture of water and a water-miscible solvent. Accordingly, the term "in water-dispersed form" means that the particular polymer is dispersed as a solid or liquid in the continuous aqueous phase.

According to the invention, mixtures of chemically and/or structurally different copolymers of at least one aliphatic, acyclic alkene with at least one $\alpha,\beta$-unsaturated carboxylic acid are regarded as a copolymer mixture. Thus, for example, copolymers which contain different alkenes or different $\alpha,\beta$-unsaturated carboxylic acids as comonomers, or which have a different number of comonomers in the copolymer which are otherwise identical, may all be present in a copolymer mixture of a lacquer formulation according to the invention.

According to the invention, the acid number is a characteristic value which is to be determined experimentally, and which is a measure for the number of free acid groups in the copolymer or in the copolymer mixture. The acid number is determined by dissolving a weighed quantity of the copolymer or the copolymer mixture in a solvent mixture of methanol and distilled water in a 3:1 volume ratio, and subsequently potentiometrically titrating with 0.05 mol/L KOH in methanol. The potentiometric measurement is carried out using a combined electrode (LL-Solvotrode® from Metrohm; reference electrolyte: 0.4 mol/L tetraethylammonium bromide in ethylene glycol). The acid number corresponds to the added quantity of KOH in milligrams per gram of copolymer or copolymer mixture at the turning point of the potentiometric titration curve.

The D50 value indicates that 50% by volume of the dispersed polymeric components of the can inner coating have a size below the stated value.

The D50 value may be determined from volume-weighted cumulative particle size distributions; those skilled in the art are familiar with appropriate dynamic light scattering methods which may be used to measure the particle size distribution curve.

The curing agent of the lacquer in the method according to the invention must have the property that it crosslinks with the copolymer or the copolymer mixture via condensation reactions only at temperatures above the glass transition temperature, preferably only above 100° C., since otherwise, curing would already take place before the dispersed polymeric components of the lacquer could form a complete film, thus producing very heterogeneous lacquer films on the aluminum strip. Water-soluble organic as well as water-soluble inorganic curing agents are suitable as curing systems. Organic curing agents are water-soluble within the meaning of the present invention when their solubility in deionized water ($\kappa < 1$ $\mu Scm^{-1}$) at 20° C. is at least 5 g/L in each case.

Aminoplast curing agents based on melamine, urea, dicyandiamide, guanamines, and/or guanidine are particularly suitable water-soluble organic curing agents in lacquers of the method according to the invention. Melamine-formaldehyde resins having a formaldehyde to melamine molar ratio of preferably greater than 1.5 are particularly preferred as aminoplast curing agents.

Alternatively or additionally, the water-soluble organic curing agent of the lacquer in the method according to the invention is a carbodiimide. According to the invention, carbodiimides have at least one diimide structural unit of the —C=N=C— type. However, they are preferably polyfunctional, with a diimide equivalent weight in the range of 300-500 grams of the polyfunctional compound per mole of diimide groups. Particularly preferred are carbodiimides that result from isocyanates with at least two isocyanate groups by decarboxylation, in particular those of the general structural formula (I):

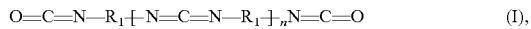

where n: a natural whole number in the range of 1 to 20;
  $R_1$: an aromatic, aliphatic, or alicyclic radical containing no more than 16 carbon atoms.

The isocyanate groups in turn are preferably blocked with hydrophilic protective groups, which as such provide the carbodiimide with improved water dispersibility or water solubility. Use of these preferred carbodiimides results in the additional advantage that the lacquer may be formulated almost completely free of organic solvents, since the carbodiimides have good solubility in water without already crosslinking with the copolymer or the copolymer mixture in the aqueous formulation. In one preferred embodiment of a can inner coating according to the invention which contains, at least in part, carbodiimides as curing agent, the proportion of organic solvents is therefore below 10% by weight, particularly preferably below 4% by weight, and in particular the can inner coating preferably contains no solvent. Examples of suitable protective groups having a hydrophilic character are hydroxyalkylsulfonic acids, hydroxyalkylphosphonic acids, hydroxyalkylphosphoric acids, polyalkylene glycols, and tertiary or quaternary aminoalkyl alcohols and aminoalkyl amines. In one particularly preferred embodiment of the method, the curing agent of the lacquer is therefore selected from carbodiimides having blocked terminal isocyanate groups according to the general structural formula (II):

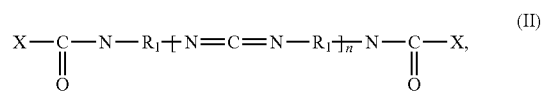

where n: a natural whole number in the range of 1 to 20;
  $R_1$: an aromatic, aliphatic, or alicyclic radical containing no more than 16 carbon atoms;
  X: —NH—$R_1$—N$(R_1)_2$, —O—$R_1$—N$(R_1)_2$, —NH—$R_1$—N$(R_1)_3$Y, —O—$R_1$—N$(R_1)_3$Y, —O—$R_1$—$SO_3$Z, —O—$R_1$—O—$PO_3$Z, —O—$R_1$—$PO_3$Z, —O—$(C_2H_4)_p$—OH, —O—$(C_3H_6)_p$—OH
    where Y: hydroxide, chloride, nitrate, sulfate
    where Z: hydrogen, ammonium, alkali metal, or alkaline earth metal
    where p: a natural whole number in the range of 1 to 6.

Examples of diisocyanates which result in the corresponding carbodiimides via decarboxylation are hexamethylene diisocyanate, cyclohexane-1,4-diisocyanate, xylylene diisocyanate, Isophorone diisocyanate, dicyclohexylmethane-4,4-diisocyanate, methylcyclohexane diisocyanate, and tetramethylxylylene diisocyanate, 1,5-naphthylene diisocyanate, 4,4-diphenylmethane diisocyanate, 4,4-diphenyldimethylmethane diisocyanate, 1,3-phenylene diisocyanate, 1,4-phenylene diisocyanate, 2,4-toluenylene diisocyanate, 2,6-toluenylene diisocyanate, Alternatively or additionally, the water-soluble organic curing agent of the lacquer in the method according to the invention is an organic polymer or copolymer having hydroxyl groups but not based on aromatic epoxides, preferably a polymer and/or copolymer of vinyl alcohol, the hydroxyl number of the organic polymers or copolymers preferably being at least 100 mg KOH/g. Such polymers may enter into etherification reactions with the carboxyl groups of the copolymers or the copolymer mixture according to component a) at the burn-in temperature of the lacquer, and thus bring about crosslinking of the binder. In one preferred method, however, the weight fraction of these polymers and/or copolymers, based on the weight fraction of the copolymer or the copolymer mixture according to component a) of the lacquer, is not greater than 20%.

The hydroxyl number is a measure for the number of free hydroxyl groups in the polymer or in a polymer mixture, and is experimentally determined by potentiometric titration. For this purpose, a weighed quantity of the polymer or the polymer mixture is heated in a reaction solution of 0.1 mol/L phthalic acid anhydride in pyridine at 130° C. for 45 minutes, and is initially combined with 1.5 times the volume of the reaction solution of pyridine, and subsequently combined with 1.5 times the volume of the reaction solution of deionized water ($\kappa < 1$ $\mu Scm^{-1}$). The quantity of phthalic acid that is released is titrated in this mixture, using 1 M sodium hydroxide solution. The potentiometric measurement is carried out using a combined electrode (LL-Solvotrode® from Metrohm; reference electrolyte: 0.4 mol/L tetraethylammonium bromide in ethylene glycol). The hydroxyl number corresponds to the added quantity of NaOH per gram of copolymer or copolymer mixture at the turning point of the potentiometric titration curve.

In principle, for water-soluble organic curing agents it is preferred when they have a weight average molecular weight $M_W$ of not greater than 2,500 u, particularly preferably not greater than 1,500 u, in order to ensure sufficient crosslinking with the copolymer or the copolymer mixture.

In the method according to the invention, a curing system of the lacquer which is an alternative to the organic curing agent is based on water-soluble inorganic compounds of the elements Zr and/or Ti. Such inorganic compounds are water-soluble within the meaning of the present invention when their solubility in deionized water ($\kappa$<1 $\mu Scm^{-1}$) at 20° C. is at least 1 g/L in each case, based on the particular element Zr and/or Ti. Preferred representatives of these water-soluble inorganic curing agents are selected from alkoxides and/or carbonates, particularly preferably from tetrabutoxy zirconate, tetrapropoxy zirconate, tetrabutoxy titanate, tetrapropoxy titanate, ammonium zirconium carbonate, and/or ammonium titanium carbonate, with ammonium zirconium carbonate being particularly preferred.

For adequate crosslinking of the copolymers or the copolymer mixture according to component a) of the lacquer on the one hand, and good lacquer adhesion on the other hand, which obviates the need for additional pretreatment of the aluminum strip prior to application of the lacquer for improving the lacquer adhesion, it is preferred when the weight fraction of the inorganic curing agent, based on water-soluble inorganic compounds of the elements Zr and/or Ti, determined as the weight fraction of the elements Zr and/or Ti, based on the solids fraction of the copolymer or the copolymer mixture according to component a), divided by the dimensionless acid number of the copolymer or the copolymer mixture according to component a), in grams KOH/g is greater than $0.04 \cdot X_{Zr} + 0.02 \cdot X_{Ti}$. Conversely, it is preferred that this same weight ratio, divided by the dimensionless acid number of the copolymer or the copolymer mixture according to component a), in grams KOH/g is preferably less than $0.12 \cdot X_{Zr} + 0.06 \cdot X_{Ti}$ in order to obtain stable lacquer formulations. $X_{Zr}$ and $X_{Ti}$ are the respective mass fractions of the elements Zr or Ti of the curing agent according to component b), based on the total content of the elements Zr and Ti of the curing agent.

One advantage of such lacquers based on inorganic curing agents of water-soluble inorganic compounds of the elements Zr and/or Ti is that organic curing agents which have amino groups, imine groups, or carbodiimide groups and which for good crosslinking are customarily contained in a weight fraction above 20%, based on component a) of the lacquer, can be dispensed with entirely. Therefore, in one preferred embodiment of the method according to the invention, less than 1% by weight, particularly preferably less than 0.1% by weight, more particularly preferably less than 0.01% by weight, of water-soluble and water-dispersed organic curing agents having amino groups, imine groups, or carbodiimide groups are contained.

The copolymer or the copolymer mixture of the aliphatic, acyclic alkene with an $\alpha,\beta$-unsaturated carboxylic acid having the specified acid number, as a thin film melted onto metal surfaces, already shows good lacquer adhesion and high flexibility, in particular on surfaces of aluminum. In addition, the acid groups give the copolymer or the copolymer mixture the inherent property of being self-emulsifying, so that emulsifiers or solvents for providing a lacquer having good filming may largely be dispensed with in the method according to the invention.

If the acid number of the copolymers or copolymer mixture of alkenes and $\alpha,\beta$-unsaturated carboxylic acids according to component a) is below 20 mg KOH/g, the lacquer formulation which is cured on an aluminum surface does not have sufficient adhesion, and therefore is not suitable as a film-forming component of lacquers for coating aluminum strip in a method according to the invention. Conversely, an acid number of the copolymers or the copolymer mixture of alkenes and $\alpha,\beta$-unsaturated carboxylic acids which is above 200 mg KOH/g, as a film-forming component in lacquers, results in an inadequate barrier effect against corrosively acting ions in aqueous media, and also results in a lacquer coating which is comparatively less resistant to water at temperatures above 60° C.

The weight fraction of the aliphatic, acyclic alkenes in the copolymer or in the copolymer mixture is preferably at least 40% by weight, particularly preferably at least 60% by weight, but preferably not more than 95% by weight. This ensures that the ion permeability of the cured lacquer on the aluminum strip and the swelling of the lacquer upon contact with aqueous media, at the same time with sufficient wettability and adhesion of the lacquer to the can material, are reduced to the maximum extent possible. This is advantageous in particular when the aluminum strip is coated with the lacquer on both sides, so that, after manufacture of the can, the can lid which is produced according to the invention from the aluminum strip is in contact on its inner side with the liquid filled into the can.

Preferred aliphatic, acyclic alkenes of the copolymers or the copolymer mixture contained according to the invention are selected from ethene, propene, 1-butene, 2-butene, isobutene, 1,3-butadiene, and/or 2-methyl-1,3-butadiene, particularly preferably ethene.

Preferred $\alpha,\beta$-unsaturated carboxylic acids of the copolymers or the copolymer mixture contained according to the invention are selected from cinnamic acid, crotonic acid, fumaric acid, itaconic acid, maleic acid, acrylic acid, and/or methacrylic acid, particularly preferably acrylic acid and/or methacrylic acid, in particular acrylic acid.

Further comonomers which may be an additional component of the copolymers or copolymer mixture in a can inner coating according to the invention are selected from esters of $\alpha,\beta$-unsaturated carboxylic acids, preferably linear or branched alkyl esters of acrylic acid and/or methacrylic acid which contain no more than 12 carbon atoms in the aliphatic radical. Such comonomers improve the adhesion, and at the same time the flexibility, of the cured lacquer on metal surfaces due to increased mobility of the polymer base structure, which in turn facilitates the orientation of the acid groups having a surface affinity for the aluminum surface. This effect comes into play in particular at low acid numbers of the copolymer below 100 mg KOH/g. It has generally been shown that low acid numbers of the copolymers or of the copolymer mixture improve the barrier properties of the cured lacquer formulation during exposure to aqueous media. Accordingly, copolymers or copolymer mixtures which additionally contain the above-described comonomers, with acid numbers below 100 mg KOH/g, in particular below 60 mg KOH/g, are preferred in the method according to the invention.

The copolymer or the copolymer mixture of the lacquer preferably contains less than 0.05% by weight, particularly preferably less than 0.01% by weight, of epoxidically bound oxygen.

For good film formation during curing of the lacquer, it is necessary that the water-dispersed copolymer or the water-dispersed copolymer mixture of the lacquer goes into the melted state after the aqueous phase evaporates. In order to meet this requirement, copolymers or copolymer mixtures are preferred which, as such, have a glass transition temperature of not greater than 80° C., particularly preferably not greater than 60° C. Copolymers or copolymer mixtures which are composed of alkenes and α,β-unsaturated carboxylic acids and which have a weight average molecular weight $M_W$ of not greater than 20,000 u typically have glass transition temperatures considerably below 100° C., so that copolymers or copolymer mixtures having a weight average molecular weight of not greater than 20.000 u, in particular not greater than 15.000 u, are preferred in lacquers of the method according to the invention.

In one preferred lacquer formulation of the method according to the invention, the acid groups of the copolymer dispersed in water or of the copolymer mixture according to component a) dispersed in water are at least partially neutralized. This measure increases the capability of the copolymers for self-emulsification in the aqueous phase, resulting in more stable lacquer formulations with smaller particle sizes of the dispersed copolymers. Accordingly, the lacquer in the method according to the invention preferably additionally contains a neutralizing agent.

As neutralizing agents which are additionally contained in such a preferred lacquer formulation, ammonia, amines, metallic aluminum, and/or zinc, preferably in powder form, are preferably suited, as well as water-soluble oxides and hydroxides of the elements Li, Na, K, Mg, Ca, Fe(II), and Sn(II). Those skilled in the art are aware here that the neutralizing agents, corresponding to their function, enter into neutralization reactions with the components of the lacquer, and in these preferred formulations are therefore optionally detectable as such only indirectly in the form of their reaction products. For example, metallic aluminum or zinc powder reacts in the aqueous phase of the lacquer, giving off hydrogen, to form the corresponding hydroxides, which in turn result in the neutralization of acid groups of the copolymer or the copolymer mixture, so that ultimately, only the cations of the elements aluminum or zinc are detectable in the lacquer formulation. The neutralizing agents are therefore to be understood only as formulation aids for the lacquers for the method according to the invention.

Particularly preferred neutralizing agents are ammonia and amines, since they go into the gaseous phase when the lacquer is cured at elevated temperature, and therefore do not remain in the cured lacquer. Preferred amines which may be used as neutralizing agent in lacquers of the method according to the invention are morpholine, hydrazine, hydroxylamine, monoethanolamine, diethanolamine, triethanolamine, dimethylethanolamine, and/or diethylethanolamine.

The neutralization of the acid groups of the copolymer or the copolymer mixture in lacquers of the method according to the invention preferably takes place to such a degree that at least 20%, particularly preferably at least 30%, of the acid groups are neutralized. In one preferred embodiment of the lacquers of the method according to the invention, high neutralization rates above 50%, preferably above 40%, should be avoided, since the almost completely neutralized copolymers are already dissolved in significant quantities in water, and thus undispersed, resulting in high viscosity of the lacquer, so that such formulations are less well suited on account of their rheological properties.

In this regard, it is preferred to add the neutralizing agent to the lacquer in such a quantity in the formulation that, based on 1 g of the copolymer or the copolymer mixture, the neutralizing agent contains at least 4/z μmol, preferably at least 6/z μmol, in each case multiplied by the acid number of the copolymer or the copolymer mixture, but preferably not more than 10/z μmol, particularly preferably not more than 8/z μmol, multiplied by the acid number of the copolymer or the copolymer mixture. The divisor z is a natural number, and corresponds to the equivalent number of the neutralization reaction. The equivalent number indicates how many moles of acid groups of the copolymer or the copolymer mixture are neutralizable by one mole of the neutralizing agent.

The dispersed polymeric components of the water-based lacquer have a D50 value of less than 1 μm, and therefore can optimally crosslink in the presence of the curing agent according to component b) during drying and curing of a wet film of the lacquer in the method according to the invention. A fairly coarse dispersion of the polymeric components, in particular of the copolymers or the copolymer mixture according to component a) of the present invention, makes homogeneous crosslinking more difficult, since the water-dispersed polymeric components according to component a) are able to penetrate the water-soluble curing agent only to a very limited extent. This applies in particular for the inorganic curing agents based on water-soluble compounds of the elements Zr and/or Ti. In this regard, a dispersion of the polymeric components in which a D50 value of less than 0.5 μm is achieved is preferred. Conversely, the viscosity of the lacquer increases for an increasingly finer-particle dispersion of the polymeric components, so that the D50 value is preferably not less than 0.1 μm to still be able to ensure simple application of the lacquer.

A particularly preferred lacquer in the method according to the invention contains at least 40% by weight water and
a) 4-30% by weight, preferably 10-20% by weight, of the above-described copolymer or the above-described copolymer mixture in dispersed form,
b) 0.05-4% by weight, preferably 0.1-2% by weight, of the at least one curing agent based on inorganic compounds of the elements Zr and/or Ti,
c) not greater than 0.1% by weight of water-soluble organic curing agents containing amino groups, imine groups, or carbodiimide groups;
d) not greater than 5% by weight of emulsifiers selected from nonionic amphiphiles having an HLB value of at least 8;
e) not greater than 10% by weight, preferably not greater than 5% by weight, of organic water-miscible solvents;
f) not greater than 10% by weight, preferably at least 1% by weight, of auxiliary substances selected from wetting agents, leveling agents, defoaming agents, catalysts, film-forming agents, stabilizers, and/or neutralizing agents.

In the method according to the invention for manufacturing coated can lids from aluminum strip, the strip is optionally initially cleaned, and the lacquer is subsequently applied to the aluminum strip, with or without a rinsing step in between. The lacquer is preferably applied on both sides, so that no further coating with a lacquer is necessary after the coated strip material is punched out and formed into the can lid. The cured lacquer has excellent flexibility and lacquer adhesion, so that in the method according to the invention, forming the punched aluminum strip parts into the can lid does not cause lacquer peeling or damage to the lacquer, which otherwise may result in delamination of the coating, and thus undesirable infiltration of lacquer components into the filling material, when the inner surfaces of the manufactured cans are exposed to liquids filled therein. When inorganic curing agents based on water-soluble compounds of the elements Zr and/or Ti are used, the lacquer adhesion is such that, in one preferred method according to the invention, the cleaned aluminum strip does not undergo such a wet chemical treatment step prior to application of the lacquer, resulting in a conversion coating having a coating weight of at least 5 mg/m², based on metal elements which are not components of the can material. In particular, there are no wet chemical treatment steps using chromium-free aqueous compositions containing water-soluble compounds of the elements Zr, Ti, and/or Si, and preferably less than 0.1% by weight of organic polymers. According to the invention, cleaning of the aluminum strip prior to application of the lacquer is used to provide a metallic surface which is largely free of organic components, and preferably takes place using alkaline to neutral aqueous cleaners which are known in the surface treatment of aluminum.

In the method according to the invention, the lacquer is preferably applied to the surface of the aluminum strip in a dry coating layer of at least 2 g/m², but preferably in a dry coating layer of not greater than 20 g/m². In the method according to the invention, the application of a wet film of the lacquer takes place using conventional application methods, for example by roller application or by spray methods. The wet film of the lacquer on the aluminum strip is cured to form a lacquer film in a drying oven at temperatures in the range of 120° C. to 200° C. (object temperature). The curing process includes the evaporation of the aqueous phase and the filming and crosslinking of the polymeric components.

The invention claimed is:

1. A method for manufacturing a coated can lid from an aluminum strip, comprising:
   1) initially applying a lacquer formulation to an aluminum strip and curing said lacquer formulation thereon; wherein the lacquer formulation is a water-based lacquer comprising, in addition to water, components:
      a) a copolymer or a copolymer mixture of at least one aliphatic, acyclic alkene with at least one α,β-unsaturated carboxylic acid in water-dispersed form, wherein the copolymer or the copolymer mixture has acid groups that are at least 20% neutralized, but not more than 60% neutralized, and has an acid number of at least 20 mg KOH/g but not greater than 200 mg KOH/g; and
      b) at least one water-soluble curing agent,
   wherein dispersed polymeric components of the water-based lacquer have a $D_{50}$ value of less than 0.5 μm and not less than 0.1 μm; and
   2) after step 1) punching lid material from the aluminum strip and forming the lid material into a can lid.

2. The method according to claim 1, wherein the at least one water-soluble curing agent is selected from the group consisting of aminoplasts, carbodiimides and mixtures thereof.

3. The method according to claim 1, wherein the at least one water-soluble curing agent is selected from the group consisting of polymers vinyl alcohol, copolymers of vinyl alcohol and mixtures thereof, having a hydroxyl number of at least 100 mg KOH/g.

4. The method according to claim 1, wherein the acid groups of the copolymer or the copolymer mixture are at least 30% neutralized but not more than 50% neutralized such that the copolymer or the copolymer mixture is self-emulsifying and the lacquer formulation contains no emulsifiers and/or no organic solvents.

5. The method according to claim 4, wherein the lacquer formulation further comprises ammonia, amines, metallic Al, metallic Zn, water-soluble oxides of elements Li, Na, K, Mg, Ca, Fe(II), and Sn(II), and water-soluble hydroxides of elements Li, Na, K, Mg, Ca, Fe(II), and Sn(II) as a neutralizing agent for the acid groups of the copolymer or the copolymer mixture.

6. The method according to claim 5, wherein the neutralizing agent is selected from ammonia and/or amines.

7. The method according to claim 6, wherein the neutralizing agent comprises amines selected from morpholine, hydrazine, hydroxylamine, monoethanolamine, diethanolamine, triethanolamine, dimethylethanolamine, and/or diethylethanolamine.

8. The method according to claim 1, wherein the copolymer or the copolymer mixture has a glass transition temperature of not greater than 80° C.

9. The method according to claim 1, wherein the at least one aliphatic, acyclic alkene is selected from ethene, propene, 1-butene, 2-butene, isobutene, 1,3-butadiene, and/or 2-methyl-1,3-butadiene.

10. The method according to claim 1, wherein the α,β-unsaturated carboxylic acids are selected from cinnamic acid, crotonic acid, fumaric acid, itaconic acid, maleic acid, acrylic acid, and/or methacrylic acid.

11. The method according to claim 1, wherein the at least one aliphatic, acyclic alkenes is present in in the copolymer or in the copolymer mixture in a weight fraction of at least 40% by weight, but not greater than 95% by weight.

12. The method according to claim 1, wherein the lacquer formulation comprises at least 40% by weight water and:
   a) 4-30% by weight of said copolymer or the copolymer mixture;
   b) 2-20% by weight of said at least one water-soluble curing agent;
said lacquer formulation further comprising:
   c) not greater than 5% by weight of emulsifiers selected from nonionic amphiphiles having an HLB value of at least 8;
   d) not greater than 10% by weight of organic water-miscible solvents;
   e) not greater than 10% by weight of auxiliary substances selected from the group consisting of wetting agents, leveling agents, defoaming agents, catalysts, film-forming agents, stabilizers, neutralizing agents and mixtures thereof.

13. The method according to claim 1, wherein prior to application of the lacquer formulation, the aluminum strip does not undergo a wet chemical treatment step which results in a conversion coating of at least 5 mg/m², based on metal elements which are not components of the aluminum strip.

14. The method according to claim 1, wherein the lacquer formulation is applied to the aluminum strip in an amount sufficient to produce a dry can coating layer of at least 2 g/m², but not greater than 20 g/m².

15. The method according to claim 1, wherein the aluminum strip is coated on both sides with the lacquer formulation.

16. A method for manufacturing a coated can lid from an aluminum strip, comprising:
   1) initially applying a lacquer formulation to an aluminum strip and curing said lacquer formulation thereon;

wherein the lacquer formulation is a water-based lacquer comprising, in addition to water, components:
a) a copolymer or a copolymer mixture of at least one aliphatic, acyclic alkene with at least one α,β-unsaturated carboxylic acid in water-dispersed form, wherein the copolymer or the copolymer mixture has acid groups that are at least 20% neutralized, but not more than 60% neutralized, and has an acid number of at least 20 mg KOH/g but not greater than 200 mg KOH/g; and
b) at least one water-soluble curing agent,
wherein dispersed polymeric components of the water-based lacquer have a $D_{50}$ value of less than 1 µm; and
2) after step 1) punching lid material from the aluminum strip and forming the lid material into a can lid;
wherein the at least one water-soluble curing agent is selected from inorganic compounds of elements Zr and/or Ti.

17. The method according to claim 16, wherein the inorganic compounds of elements Zr and/or Ti are selected from alkoxides and/or carbonates.

18. The method according to claim 16, wherein the inorganic compounds of elements Zr and/or Ti are selected from the group consisting of tetrabutoxy zirconate, tetrapropoxy zirconate, tetrabutoxy titanate, tetrapropoxy titanate, ammonium zirconium carbonate, ammonium titanium carbonate and mixtures thereof.

* * * * *

UNITED STATES PATENT AND TRADEMARK OFFICE
CERTIFICATE OF CORRECTION

PATENT NO. : 9,889,468 B2
APPLICATION NO. : 14/739202
DATED : February 13, 2018
INVENTOR(S) : Ard De Zeeuw, Thomas Moeller and Nicole Auweiler It is certified that error appears in the above-identified patent and that said Letters Patent is hereby corrected as shown below:

In the Claims

Column 10, Line 31, change "present in in the copolymer" to -- present in the copolymer --.

Signed and Sealed this
Sixteenth Day of October, 2018

Andrei Iancu
*Director of the United States Patent and Trademark Office*